March 31, 1925.

P. MELCHIOR

ELASTIC FLUID TURBINE

Filed Nov. 4, 1924

1,531,968

Inventor:
Paul Melchior;
by
His Attorney.

Patented Mar. 31, 1925.

UNITED STATES PATENT OFFICE.

1,531,968

PAUL MELCHIOR, OF CHARLOTTENBURG, GERMANY, ASSIGNOR TO ALLGEMEINE ELEKTRICITÄTS-GESELLSCHAFT, OF BERLIN, GERMANY.

ELASTIC-FLUID TURBINE.

Application filed November 4, 1924. Serial No. 747,859.

*To all whom it may concern:*

Be it known that I, PAUL MELCHIOR, a citizen of Germany, residing at Charlottenburg, Dahlmannstrasse 12, Germany, have invented certain new and useful Improvements in Elastic-Fluid Turbines, of which the following is a specification.

The present invention relates to elastic fluid turbines and especially to turbines of the impulse type wherein the rotor comprises one or more wheels carried by a shaft.

It is now known that rotating wheels, such as, for example, turbine wheels, when subjected periodically to shocks or impacts, as they constitute elastic bodies, are apt to have vibrations set up in them which travel at right angles to the median plane of symmetry. They then vibrate at very definite frequencies which are denoted as fundamental harmonic vibrations, and to which correspond certain forms of nodal lines.

If the number of impacts or impulses acting upon a wheel per unit of time agrees or substantially agrees with one of these definite frequencies, the vibrations in question become particularly dangerous, for in this case, the nodal waves travel so fast on the wheel disk in a direction opposite to that of rotation that it remains in the shape of a stationary wave with respect to space or to the places from which the impulses start. The deflection of the disk caused by the vibration is then liable to attain proportions such that damage or rupture of the disk may occur.

According to the present invention, the foregoing dangerous condition is prevented from occurring by making the lateral faces of the wheel or disk of different shape at different places with the result that the wheel or disk no longer has symmetry of rotation. In this case, the nodal lines are no longer able to travel in the wheel or disk at their own free wills.

In carrying out my invention, I may either add material to or take away material at different places on one or both faces of the disk or wheel, care being taken to ensure that the center of gravity of the disk remains in the middle of the shaft. By this means, the distribution of the mass and the rigidity of the wheel segments becomes non-uniform in the peripheral direction of the wheel.

As one specific means of carrying out my invention, I may provide spoke-like reinforcements on one or both sides of the disk or wheel which reinforcements are disposed at irregular, angular distances and are made of such size with relation to one another that the position of the center of gravity remains at the center of the shaft.

Figure 1:
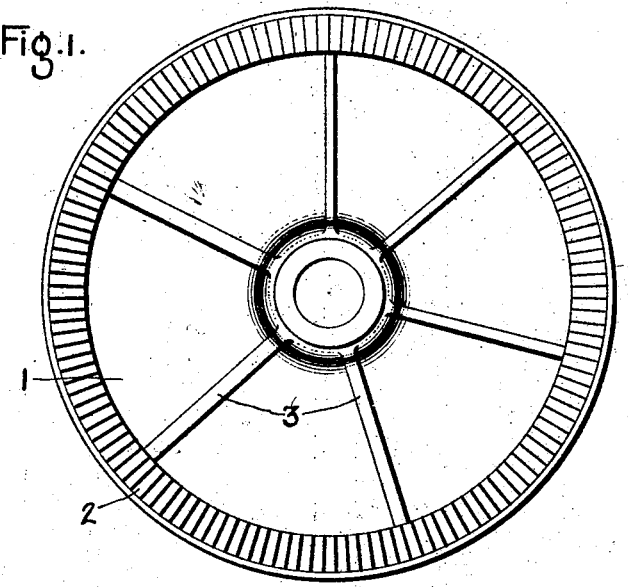
Figure 2:
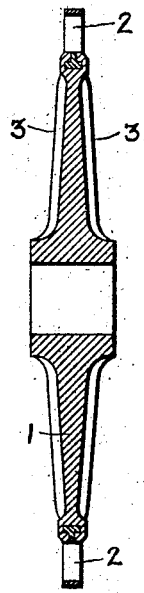

In the drawing, Fig. 1 is a side elevation of a turbine wheel embodying my invention, and Fig. 2 is a sectional view thereof.

Referring to the drawing, 1 indicates the wheel, and 2 the buckets carried by it. On the surface of the wheel on either one or both sides of it there are provided spoke-like reinforcements 3 which, as will be seen from an inspection of Fig. 1, are disposed at irregular, angular distances from each other and are made of different sizes so as to maintain the position of the center of gravity at the center of the shaft.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. A rotating wheel disk, such as a turbine wheel disk, characterized by the fact that at least one of its surfaces is provided with projections which render non-uniform the distribution of mass in the disk, the distribution of mass being such, however, that the center of gravity is maintained at the center of the disk.

2. A rotating wheel disk, such as a turbine wheel disk, characterized by the fact that at least one of its surfaces is provided with radially-extending, spoke-like projections which serve to render non-uniform the distribution of mass in the disk, said projections being so distributed that the center of gravity is maintained at the center of the disk.

In witness whereof, I have hereunto set my hand this 14th day of October, 1924.

PAUL MELCHIOR.